United States Patent
Yoshida

(10) Patent No.: US 8,067,125 B2
(45) Date of Patent: Nov. 29, 2011

(54) FUEL CELL SYSTEM AND ITS OPERATION STOP METHOD

(75) Inventor: Naohiro Yoshida, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 855 days.

(21) Appl. No.: 12/085,387

(22) PCT Filed: Nov. 29, 2006

(86) PCT No.: PCT/JP2006/324311
§ 371 (c)(1),
(2), (4) Date: May 22, 2008

(87) PCT Pub. No.: WO2007/069503
PCT Pub. Date: Jun. 21, 2007

(65) Prior Publication Data
US 2009/0286110 A1    Nov. 19, 2009

(30) Foreign Application Priority Data
Dec. 13, 2005  (JP) .................................. 2005-358845

(51) Int. Cl.
*H01M 8/04* (2006.01)
(52) U.S. Cl. ......... 429/434; 429/429; 429/433; 429/442
(58) Field of Classification Search .................. 429/429, 429/433, 434, 436, 437, 442
See application file for complete search history.

(56) References Cited

U.S. PATENT DOCUMENTS

| 2003/0190511 A1 * | 10/2003 | Yoshizawa ............. 429/24 |
| 2003/0232226 A1 | 12/2003 | Morishima et al. |
| 2004/0229097 A1 | 11/2004 | Hirakata et al. |

FOREIGN PATENT DOCUMENTS

| JP | 2002-352835 A | 12/2002 |
| JP | 2003-151601 A | 5/2003 |
| JP | 2004-111060 A | 4/2004 |
| JP | 2004-207093 A | 7/2004 |
| JP | 2005-310552 A | 11/2005 |
| JP | 2005-322527 A | 11/2005 |
| WO | WO 03/081704 A2 | 10/2003 |
| WO | WO 2004/095617 A1 | 11/2004 |

OTHER PUBLICATIONS

EG&G Services, Fuel Cell Handbook, Oct. 2000, Fifth Edition, p. 1-5.*

* cited by examiner

*Primary Examiner* — Gregg Cantelmo
*Assistant Examiner* — Eugenia Wang
(74) *Attorney, Agent, or Firm* — Kenyon & Kenyon LLP

(57) ABSTRACT

A fuel cell system includes a fuel cell which has a catalyst layer therein and which receives supply of a reactive gas to generate power, and a refrigerant system which supplies a refrigerant to the fuel cell to control its temperature. A method for stopping an operation of the system is also provided. When operated in a low-temperature environment, the system cannot be restarted due to freezing in the fuel cell. When the temperature of the fuel cell during the next system start is a predetermined temperature or less, the supply of the refrigerant is stopped during the system stop, and the supply of the refrigerant is resumed after elapse of a predetermined time.

4 Claims, 2 Drawing Sheets

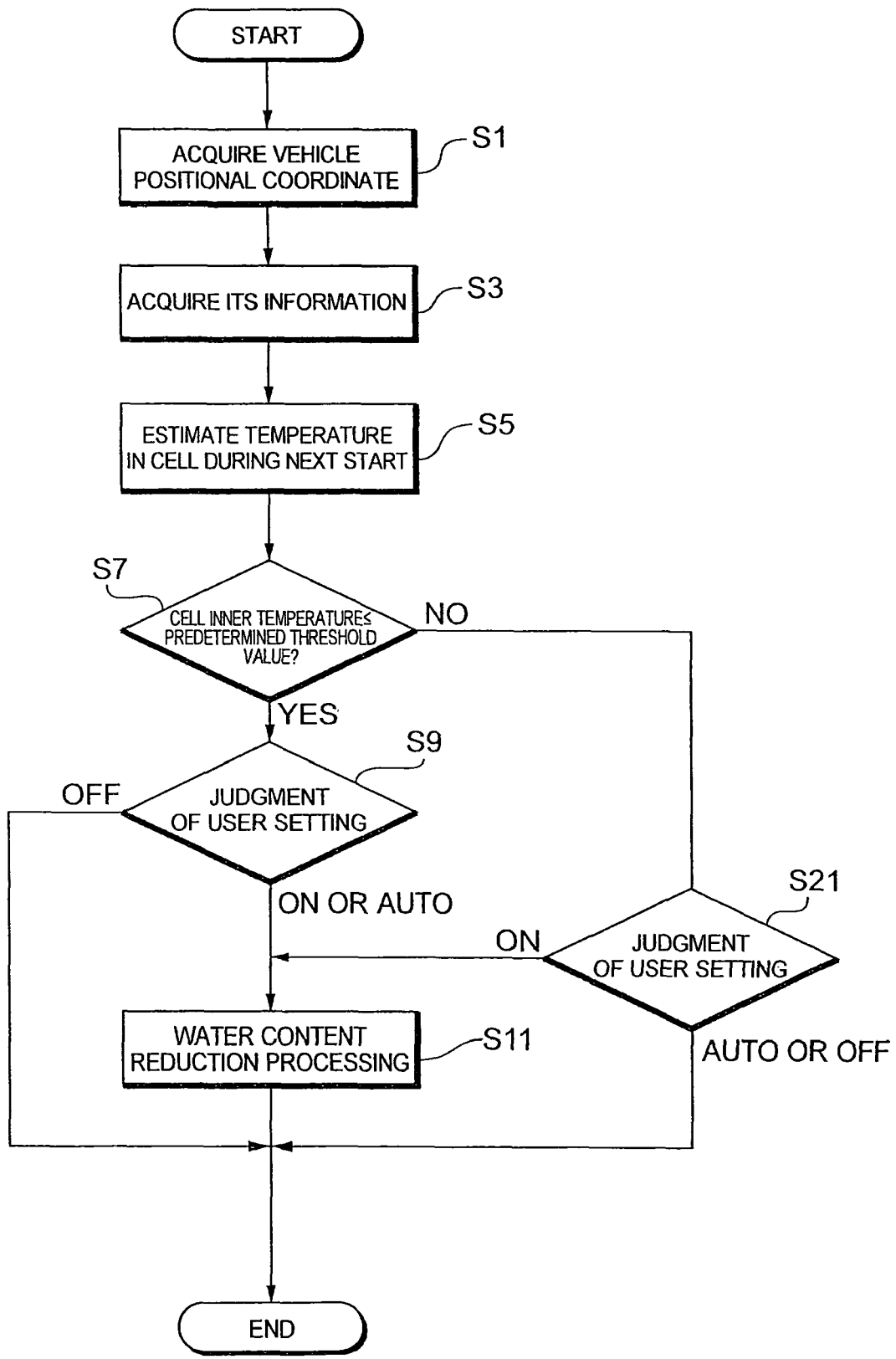

FUEL CELL SYSTEM AND ITS OPERATION STOP METHOD

This is a 371 national phase application of PCT/JP2006/324311 filed 29 Nov. 2006, which claims priority of Japanese Patent Application No. 2005-358845 filed 13 Dec. 2005, the contents of which are incorporated herein by reference.

TECHNICAL FIELD

The present invention relates to a fuel cell system provided with a fuel cell which has a catalyst layer therein and which receives supply of a reactive gas to generate a power, and a method for stopping an operation of the system.

BACKGROUND ART

In recent years, a fuel cell system has received attention in which a fuel cell to generate a power by an electrochemical reaction of a fuel gas with an oxidizing gas (these gases will hereinafter be referred to as a reactive gas) is used as an energy source. For example, when a solid polymer type fuel cell is disposed in a low-temperature environment at 0° C. or less, proceeding of the electrochemical reaction is disturbed owing to freezing in the fuel cell, especially freezing of a catalyst layer. In such a case, when the fuel cell cannot be restarted after stopping an operation of the fuel cell or even when the fuel cell can be started, a power generation efficiency is remarkably impaired.

For example, in Japanese Patent Application Laid-Open No. 2003-151601, a technology is disclosed in which to stop the fuel cell system, a flow rate of a coolant to the fuel cell is reduced to lower a cooling performance and in which the operation of the fuel cell is continued to raise a temperature of the fuel cell by use of heat generated by the electrochemical reaction. Moreover, in Japanese Patent Application Laid-Open No. 2005-322527, a technology is disclosed in which after the power generation of the fuel cell is stopped and when a temperature difference between a temperature detected by a stack inner temperature sensor and a temperature detected by a stack peripheral temperature sensor exceeds a predetermined value, the coolant is cooled and then introduced into a fuel cell stack.

DISCLOSURE OF THE INVENTION

However, in the technologies disclosed in the above publications, the above refrigerant control is performed without considering any situation for the next system start, and hence there is a possibility that useless refrigerant control is performed.

To solve the problem, an object of the present invention is to provide a fuel cell system capable of suppressing waste in refrigerant control during system stop, and a method for stopping an operation of the system.

To achieve the object, a fuel cell system of the present invention is a fuel cell system comprising: a fuel cell which has a catalyst layer therein and which receives supply of a reactive gas to generate a power; and a refrigerant system which supplies a refrigerant to this fuel cell to control a temperature of the fuel cell, wherein in a case where it is presumed that the temperature of the fuel cell during the next system start or a temperature having a correlation with the temperature of the fuel cell is a predetermined temperature or less, the refrigerant system stops the supply of the refrigerant during system stop, and resumes the supply of the refrigerant after elapse of a predetermined time.

According to the present constitution, the stopping and the resuming of the refrigerant supply (the refrigerant control) are controlled in accordance with a temperature presuming result of the fuel cell during the next system start. It is to be noted that an example of the temperature having the correlation with the temperature of the fuel cell is an outside air temperature.

In the fuel cell system of the present invention, during the system stop, the fuel cell may be allowed to generate the power in a state in which the reactive gas supply to the fuel cell is blocked.

According to the present constitution, the power generation of the fuel cell is continued even after the refrigerant supply stop, whereby evaporation of a water content in the fuel cell is promoted by heat generation accompanying the power generation.

In the fuel cell system of the present invention, the refrigerant system may, for example, intermittently supply the refrigerant to the fuel cell to control the refrigerant supply to the fuel cell so that a temperature difference between the fuel cell and the refrigerant to be supplied to the fuel cell has a predetermined value or less.

When the temperature difference between the fuel cell and the refrigerant to be supplied to the fuel cell has the predetermined value or more, there is a possibility that breakage such as crack is generated in the fuel cell owing to a thermal shock due to such a temperature difference. However, according to the present constitution, for example, the refrigerant is intermittently supplied to the fuel cell to reduce the temperature difference to the predetermined value or less, whereby the thermal shock onto the fuel cell can be relaxed. It is to be noted that the temperature of the fuel cell may be a temperature of the refrigerant discharged from the fuel cell.

The fuel cell system of the present invention may include an abnormality judgment section which judges an abnormality of the refrigerant system based on the temperature of the refrigerant discharged from the fuel cell.

When the refrigerant normally circulates through the refrigerant system while cooling the fuel cell, the temperature of the refrigerant discharged from the fuel cell must rise as compared with the temperature of the refrigerant supplied to the fuel cell. Therefore, according to the present constitution, the temperature of the refrigerant discharged from the fuel cell is monitored, and when the temperature does not rise, it can be considered that the refrigerant system has a certain abnormality such as generation of clogging in a refrigerant path.

It is to be noted that the case where the temperature of the refrigerant does not rise includes not only a case where the temperature of the refrigerant does not rise at all but also a case where a temperature rise width per unit time or a temperature rise ratio is a predetermined value or less.

A method for stopping an operation of a fuel cell system according to the present invention is a method for stopping an operation of a fuel cell system comprising: a fuel cell which has a catalyst layer therein and which receives supply of a reactive gas to generate a power; and a refrigerant system which supplies a refrigerant to this fuel cell to control a temperature of the fuel cell, wherein in a case where it is presumed that the temperature of the fuel cell during the next system start or a temperature having a correlation with the temperature of the fuel cell is a predetermined temperature or less, the supply of the refrigerant is stopped during system stop, and the supply of the refrigerant is resumed after elapse of a predetermined time.

According to the present constitution, the stopping and the resuming of the refrigerant supply (the refrigerant control)

are controlled in accordance with a temperature presuming result of the fuel cell during the next system start.

According to the present invention, the stopping and the resuming of the refrigerant supply (the refrigerant control) are controlled in accordance with the temperature presuming result of the fuel cell during the next system start, so that waste in the refrigerant control during the system stop can be suppressed.

BRIEF DESCRIPTION OF THE DRAWINGS

FIG. 2 is a flow chart showing a fuel cell system stopping operation to be performed by a control section shown in FIG. 1.

BEST MODE FOR CARRYING OUT THE INVENTION

Figure 1:
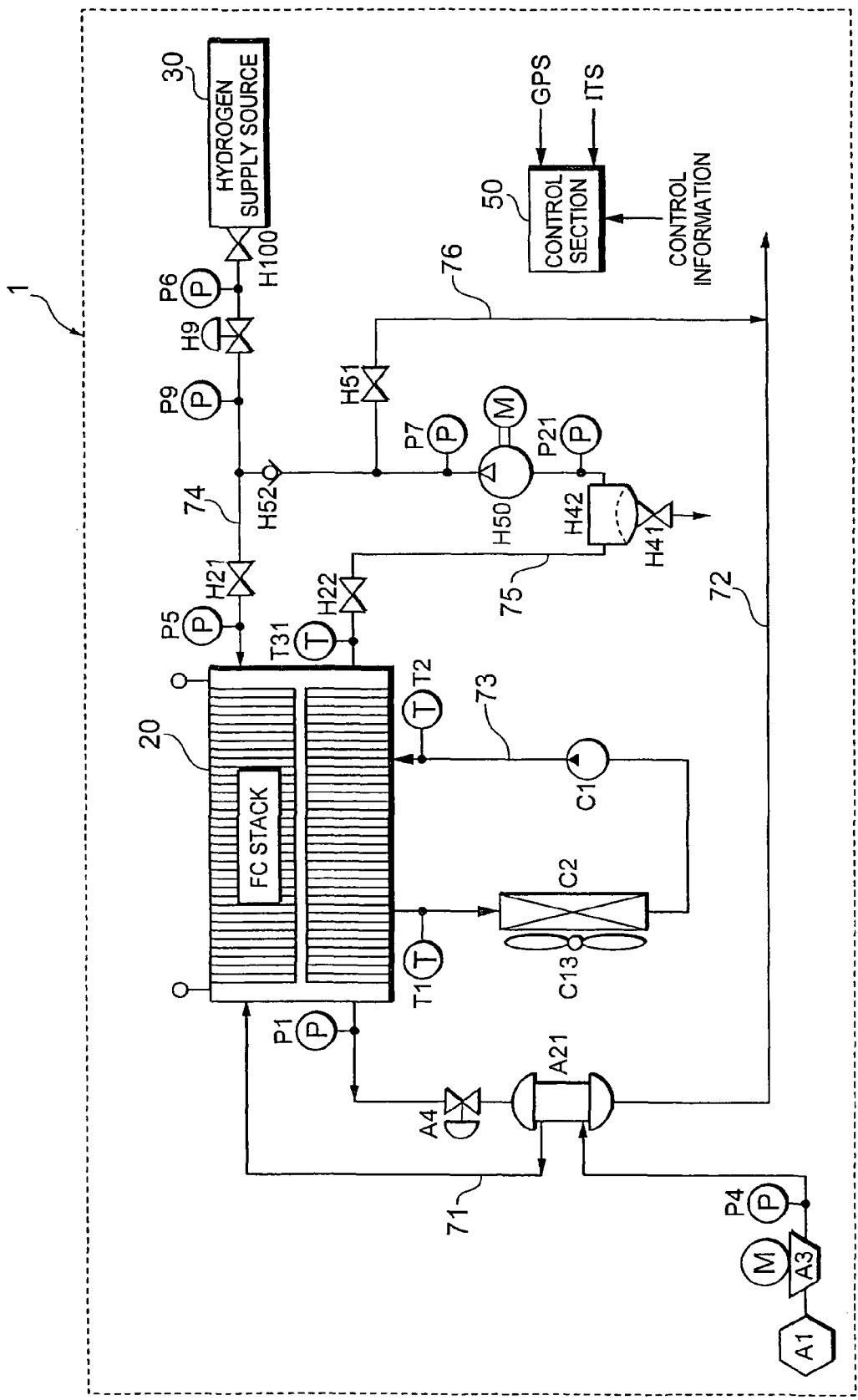
FIG. 1 is a system constitution diagram schematically showing one embodiment of a fuel cell system according to the present invention.

Next, one embodiment of a fuel cell system according to the present invention will be described. A case where this fuel cell system is applied to a vehicle-mounted power generation system of a fuel cell vehicle will hereinafter be described, but the present invention is not limited to such an application example. The present invention is applicable to any mobile body such as a ship, an airplane or a train or a walking robot, and is additionally applicable to a stationary power generation system in which a fuel cell is used as a power generation equipment for a construction (a housing, a building or the like).

As shown in FIG. 1, air (outside air) as an oxidizing gas (a reactive gas) is supplied to an air supply port of a fuel cell 20 via an air supply path 71. The air supply path 71 is provided with an air filter A1 which removes fine particles from air, a compressor A3 which pressurizes the air, a pressure sensor P4 which detects a supply air pressure, and a humidifier A21 which adds a required water content to air. The compressor A3 is driven by a motor (an auxiliary device). This motor is driven and controlled by a control section 50 described later. It is to be noted that the air filter A1 is provided with an air flow meter (not shown) which detects an air flow rate.

An air off gas discharged from the fuel cell 20 is discharged via an exhaust path 72. The exhaust path 72 is provided with a pressure sensor P1 which detects an exhaust pressure, a pressure adjustment valve A4 and a heat exchanger of the humidifier A21. The pressure sensor P1 is provided in the vicinity of an air exhaust port of the fuel cell 20. The pressure adjustment valve A4 functions as a pressure adjustment (pressure reduction) unit which sets a supply air pressure to the fuel cell 20.

Detection signals (not shown) of the pressure sensors P4, P1 are sent to the control section 50. The control section 50 adjusts a motor rotation speed of the compressor A3 and an opening area of the pressure adjustment valve A4 to set a supply air pressure and a supply air flow rate with respect to the fuel cell 20.

A hydrogen gas as the fuel gas (the reactive gas) is supplied from a hydrogen supply source 30 to a hydrogen supply port of the fuel cell 20 via a fuel supply path 74. The hydrogen supply source 30 corresponds to, for example, a high-pressure hydrogen tank, but may be a fuel reformer, a hydrogen occluded alloy or the like.

The fuel supply path 74 is provided with a block valve H100 which supplies hydrogen from the hydrogen supply source 30 or which stops the supply, a pressure sensor P6 which detects a supply pressure of the hydrogen gas from the hydrogen supply source 30, a hydrogen pressure adjustment valve H9 which reduces the supply pressure of the hydrogen gas to the fuel cell 20 to adjust the pressure, a pressure sensor P9 which detects a hydrogen gas pressure on a downstream side of the hydrogen pressure adjustment valve H9, a block valve H21 which opens and closes between the hydrogen supply port of the fuel cell 20 and the fuel supply path 74, and a pressure sensor P5 which detects an inlet pressure of the hydrogen gas of the fuel cell 20.

As the hydrogen pressure adjustment valve H9, for example, a mechanical pressure adjustment valve which reduces the pressure may be used, but a valve having a valve open degree linearly or continuously adjusted by a pulse motor may be used. Detection signals (not shown) of the pressure sensors P5, P6 and P9 are supplied to the control section 50.

The hydrogen gas which has not been consumed by the fuel cell 20 is discharged as a hydrogen off gas to a hydrogen circulation path 75, and is returned to a downstream side of the hydrogen pressure adjustment valve H9 of the fuel supply path 74. The hydrogen circulation path 75 is provided with a temperature sensor T31 which detects a temperature of the hydrogen off gas, a block valve H22 which connects or disconnects the fuel cell 20 to or from the hydrogen circulation path 75, a gas-liquid separator H42 which collects a water content from the hydrogen off gas, a water discharge valve H41 which returns formed and collected water to a tank (not shown) or the like outside the hydrogen circulation path 75, a hydrogen pump H50 which pressurizes the hydrogen off gas and a check valve H52. Hydrogen pump H50 is driven by a motor M. Pressure sensors P7 and P21 detect outlet and inlet pressures of pump H50, respectively.

The block valves H21, H22 close the fuel cell 20 on an anode side. A detection signal (not shown) of the temperature sensor T31 is supplied to the control section 50. An operation of the hydrogen pump H50 is controlled by the control section 50.

The hydrogen off gas joins the hydrogen gas in the fuel supply path 74, is supplied to the fuel cell 20 and is reused. The check valve H52 prevents a counter flow of the hydrogen gas of the fuel supply path 74 on the side of the hydrogen circulation path 75. The block valves H100, H21 and H22 are driven in response to a signal from the control section 50.

The hydrogen circulation path 75 is connected to the exhaust path 72 by a purge channel 76 via a discharge control valve H51. The discharge control valve H51 is an electromagnetic block valve, and operates in accordance with a command from the control section 50 to discharge (purge) the hydrogen off gas from the system. This purge operation is intermittently performed, whereby it can be prevented that the circulation of the hydrogen off gas is repeated to lower a cell voltage owing to increase of an impurity concentration of the hydrogen gas on the side of a fuel pole.

A cooling water outlet/inlet of the fuel cell 20 is provided with a cooling path 73 which circulates cooling water (a refrigerant) therethrough. The cooling path 73 is provided with a temperature sensor T1 which detects a temperature of the cooling water discharged from the fuel cell 20, a radiator (a heat exchanger) C2 which radiates heat of the cooling water from the system, a pump C1 which pressurizes and circulates the cooling water, and a temperature sensor T2 which detects a temperature of the cooling water to be supplied to the fuel cell 20. The radiator C2 is provided with a cooling fan C13 which is driven and rotated by a motor.

Detection signals of the temperature sensors T1, T2 are supplied to the control section 50, and driving of the pump C1 and the cooling fan C13 is controlled by the control section 50. That is, in the present embodiment, the cooling path 73, the temperature sensor T1, the radiator C2, the pump C1, the temperature sensor T2, the cooling fan C13 and the control section 50 constitute a refrigerant system of the present invention.

The fuel cell 20 is constituted as a fuel cell stack in which a predetermined number of unitary cells for receiving supply of the fuel gas and the oxidizing gas to generate a power are laminated. Each unitary cell is constituted of a pair of separators having a fluid channel (a reactive gas channel, a refrigerant channel) and formed of a conductive material, and a membrane electrode assembly (MEA) held between the pair of separators. The MEA is constituted of an electrolytic film and a pair of electrodes arranged on opposite surfaces of the film, and each electrode has a structure in which a catalyst layer and a diffusion layer are laminated from the side of the electrolytic film.

The catalyst layer is arranged adjacent to the electrolytic film, and includes, for example, a solid electrolyte, carbon particles (catalyst carrying carbon) and a catalyst carried by the carbon particles. As the catalyst, for example, platinum, a platinum alloy or the like is preferably used. On the other hand, the diffusion layer is a conductor having a function of passing fluids (the fuel gas, the oxidizing gas and the formed water) and a function of conducting a current through the catalyst layer and the separators.

This fuel cell 20 is provided with gas channels defined by the diffusion layer and fluid channel grooves of the separators on the opposite surfaces of the fuel cell via the MEA, whereby the hydrogen gas as the fuel gas and air as the oxidizing gas are supplied to the gas channels, and the hydrogen gas electrochemically reacts with oxygen in the air via the MEA to generate the power.

The power generated by the fuel cell 20 is supplied to a power control unit (not shown). The power control unit includes an inverter which supplies the power to a driving motor of a vehicle, an inverter which supplies the power to any auxiliary device such as a compressor motor or a motor for the hydrogen pump, a DC-DC converter which charges accumulation means such as a secondary cell to supply the power from the accumulation means to the motors and the like.

The control section 50 receives control information from a required load such as a vehicle acceleration signal (not shown) and sensors (a pressure sensor, a temperature sensor, a flow rate sensor, an output current meter, a power voltage meter, etc.) of sections of a fuel cell system 1 to control operations of valves and the motors of the sections of the system.

In addition, for example, after a user (a driver) turns off ignition or the like to receive a system stop command, the control section 50 estimates a temperature of the fuel cell 20 during the next system start, and performs an intermittent operation of the pump C1 or the like provided in the cooling path 73 to reduce the water content in the fuel cell 20 based on an estimated result.

Moreover, in the present embodiment, the user can arbitrarily select whether or not to require water content reduction processing realized by performing such an intermittent operation of the pump C1 or the like (hereinafter sometimes referred to simply as the "water content reduction processing"), regardless of an estimation result of the control section 50. For example, in a case where the user sets a selection switch to "ON", even when the presumed temperature exceeds a predetermined threshold value, the control section 50 performs the water content reduction processing.

On the other hand, in a case where the user sets the selection switch to "OFF", even when the presumed temperature has the predetermined threshold value or less, the control section 50 does not perform the water content reduction processing. Moreover, in a case where the user sets the selection switch to "AUTO", the control section 50 performs the water content reduction processing based on the estimated temperature.

With regard to the temperature of the fuel cell 20 during the next system start, a change of an outside air temperature supposedly to be received by the vehicle from now on is estimated from a positional coordinate of the vehicle measured using, for example, GPS or the like, by use of past temperature transitional information and estimated temperature transitional information in the corresponding place acquired from external intelligent transport systems (ITS), calendar information (month, day, etc.) and time information. The control section also refers to a map or the like indicating a relation between the outside air temperature beforehand stored in a storage unit or the like of the control section 50 and an inner temperature (hereinafter referred to as the cell inner temperature) of the fuel cell 20 to estimate the temperature of the fuel cell.

The water content reduction processing is performed, for example, in a case where it is presumed that the cell inner temperature is 0 degree or less. As described later, this water content reduction processing allows the fuel cell 20 to generate the power in a state in which both the cooling water supply and the reactive gas supply to the fuel cell 20 are stopped. More specifically, in a state in which the pump C1 and the cooling fan C13 of the radiator C2 provided along the cooling path 73 are stopped, the fuel cell 20 is allowed to generate the power.

It is to be noted that the control section 50 is constituted of a control computer system (not shown). This control computer system has a known constitution including a CPU, an ROM, an RAM, an HDD, an input/output interface, a display and the like, and is constituted of a commercially available computer system for control.

Next, a stop operation of the fuel cell system 1 by the control section 50 will be described. In a main control program (not shown), in a case where the control section 50 judges that a command to instruct a run stopping operation (e.g., ignition OFF) has been issued or a flag has been set (event generation), processing shown in a flow chart of FIG. 2 is executed.

First, the control section 50 receives (acquires), from a vehicle-mounted GPS, the positional coordinate of the vehicle on which the fuel cell system 1 according to the present embodiment is mounted (step S1). Subsequently, the positional coordinate received in the step S1 is transmitted to an ITS, and the past temperature transitional information and the estimated temperature transitional information in the corresponding place are received (acquired) from the ITS (step S3). Subsequently, the temperature change supposedly to be received by the vehicle from now on is estimated based on the temperature transitional information and the estimated temperature transitional information received in the step S3, the calendar information (month, day, etc.) and the time information, and the cell inner temperature during the next system start is estimated with reference to the map showing the relation between the outside air temperature and the cell inner temperature (step S5).

Thereafter, it is judged whether the estimated cell inner temperature has the predetermined threshold value (e.g., 0° C.) or less, in other words, whether the cell, especially the catalyst layer, is frozen during the next system start (step S7).

In a case where this judgment result is "YES", the processing advances to step S9 in which it is judged whether the user selects setting of "ON", "OFF" or "AUTO" of the selection switch, that is, the user setting is judged.

In a case where the user setting is "OFF", even when the judgment result of the step S7 is "YES", in other words, even when the cell is not frozen during the next system start, in accordance with user's will, processing of step S11 to be performed as one example of the water content reduction processing, that is, the intermittent operation of the pump C1 or the like is skipped. On the other hand, in a case where the user setting is "AUTO", the processing of the step S11 is performed in accordance with the judgment result "YES" of the step S7. In a case where the user setting is "ON", the processing is performed in accordance with the user's intention.

In the water content reduction processing of the step S11, first the operation of the compressor A1 is stopped to block the oxidizing gas supply to the fuel cell 20. Moreover, the block valve H100 is closed to block the fuel gas supply to the fuel cell 20, whereby the fuel cell 20 is allowed to generate the power in such a state that the reactive gas supply is blocked.

Then, the operation of the pump C1 provided along the cooling path 73, and the operation of the cooling fan C13 of the radiator C2 are stopped. In consequence, the fuel cell 20 is allowed to generate the power in a state in which the circulation of the cooling water is stopped, so that the temperature of the fuel cell 20 quickly rises, and evaporation of the water content remaining in the fuel cell 10 is promoted. As a result, the freezing in the cell during the next system start, especially the freezing of the catalyst layer is effectively inhibited.

However, when the cooling water supply to the fuel cell 20 is stopped and the temperature of the fuel cell 20 rises to a predetermined catalyst oxidizing temperature, the catalyst layer is sometimes oxidized. Therefore, the operations of the pump C1 and the cooling fan C13 are stopped during the intermittent operation, and then after elapse of a predetermined time, the operations of the pump C1 and the cooling fan C13 are resumed. In consequence, the oxidation of catalyst carrying carbon used in the catalyst layer can be inhibited, so that durability of the fuel cell 20 can be improved.

On the other hand, when the operations of the pump C1 and the cooling fan C13 are resumed during the intermittent operation and a temperature difference $\Delta T$ between the fuel cell 20 and the cooling water to be supplied to the fuel cell 20 is a predetermined value or more, breakage such as crack might be generated in the fuel cell 20 owing to a thermal shock due to this temperature difference $\Delta T$. Therefore, the pump C1 and the cooling fan C13 are intermittently operated so that the temperature difference $\Delta T$ is not above the predetermined value, whereby the temperature of the fuel cell 20 is prevented from excessively rising.

At this time, the pump C1 and the cooling fan C13 may intermittently be operated in accordance with the temperature of the fuel cell 20 or the catalyst layer, or may intermittently operated after each predetermined time. As described above, the temperature difference $\Delta T$ generated at a time when the operations of the pump C1 and the cooling fan C13 are resumed during the intermittent operation is reduced to the predetermined value or less, whereby the thermal shock given to the fuel cell 20 during the intermittent operation can be relaxed. It is to be noted that instead of the temperature of the fuel cell 20 or the catalyst layer, a temperature of the cooling water measured by the temperature sensor T1 may be used.

Moreover, during the intermittent operation of the pump C1 and the cooling fan C13, the control section 50 also functions as an abnormality judgment section which judges a cooling water system (refrigerant system) abnormality such as clogging of the cooling path 73. If the cooling water normally circulates through the cooling path 73 while cooling the fuel cell 20, the temperature of the cooling water discharged from the fuel cell 20 must rise as compared with the temperature of the cooling water supplied to the fuel cell 20.

Therefore, in the fuel cell system 1 of the present embodiment, the temperature of the cooling water discharged from the fuel cell 20 is monitored by the temperature sensor T1, and in a case where the temperature does not rise, it is judged that a certain abnormality is generated in a cooling water system, for example, the cooling path 73 is clogged. It is to be noted that the case where the temperature of the cooling water does not rise includes not only a case where the temperature of the cooling water does not rise at all but also a case where a temperature rise width per unit time or a temperature rise ratio is a predetermined value or less.

In a case where the judgment result of the step S7 is "NO", in other words, in a case where the cell is not frozen during the next system start, the processing advances to step S21 in which it is judged that the user selects the setting "ON", "OFF" or "AUTO" of the selection switch, that is, the user setting is judged. This judgment processing of the user setting is similar to the processing of the step S9, and hence description thereof is omitted.

As a result of the judgment of the step S21, in a case where the user setting is "ON", even when the judgment result of the step S7 is "NO", in other words, even when the cell is not frozen during the next system start, the processing of the step S11 is performed in accordance with the user's will.

On the other hand, in a case where the user setting is "AUTO", the processing of the step S11 is skipped in accordance with the judgment result "NO" of the step S7. When the user setting is "OFF", the processing is skipped in accordance with the user's intention.

As described above, according to the fuel cell system 1 of the present embodiment, and the method for stopping the operation of the system, the cooling water supply to the fuel cell 20 is stopped during the system stop, whereby the evaporation of the water content in the fuel cell 20 is promoted by the head held by the fuel cell 20 which has generated the heat owing to the power generation. Therefore, the freezing of the catalyst layer in the fuel cell 20 during the next system start can be inhibited.

Moreover, the cooling water supply to the fuel cell 20 is stopped, and then after the elapse of the predetermined time, the cooling water supply to the fuel cell 20 is resumed. That is, the pump C1 and the like are intermittently operated, whereby the oxidation of the catalyst layer upon and during the system stop can be inhibited. As apparent from the above description, according to the present embodiment, the stopping and resuming of the refrigerant supply (refrigerant control) are controlled in accordance with the temperature estimation result of the fuel cell 20 during the next system start, so that waste of the refrigerant control during the system stop can be suppressed.

Moreover, the user can arbitrarily select whether or not to perform the water content reduction processing of the step S11 in accordance with, for example, a situation (e.g., month, day, time, sunshine, shade, a mountain area, a plain area or the like) scheduled or presumed by the user during the next system start. Therefore, even in a case where the control section 50 judges that the water content reduction processing is required (step S7: "YES"), such processing can forcibly be prohibited. On the other hand, conversely, even in a case where the control section 50 judges that the water content reduction processing is not required (step S7: "NO"), such processing can forcibly be performed, and convenience improves.

It is to be noted that the above embodiment is merely illustration of the present invention, and the present invention is not limited to this embodiment. For example, a user's action pattern in which, for example, the user commutes by car substantially at the predetermined time every morning is learned for a comparatively short period, or a user's action pattern for a medium or long period such as a month unit or a year unit is learned. During an operation or operation stop, the next start timing (month, day, time or the like) is acquired, and the temperature during the next system start may be estimated in accordance with the timing and a weather (temperature) map in which a temperature of the fuel cell or a temperature having a correlation with the temperature is associated with the timing. This weather map may be given from the fuel cell system 1 or the outside of the vehicle, or may be learned.

INDUSTRIAL APPLICABILITY

According to the present invention, stopping and resuming (refrigerant control) of refrigerant supply are controlled in accordance with a temperature estimation result of a fuel cell during the next system start, so that waste of the refrigerant control during system stop can be suppressed. Therefore, the present invention can broadly be used in a fuel cell system having such requirement and a method for stopping an operation of the system.

The invention claimed is:

1. A fuel cell system comprising:
   a fuel cell which has a catalyst layer therein and which receives supply of a first reactive gas and a second reactive gas to generate a power; and
   a refrigerant system which supplies a refrigerant to the fuel cell to control a temperature of the fuel cell, and which includes a control section programmed to control the refrigerant system,
   wherein the control section is programmed such that, when a presumed temperature of the fuel cell during the next system start or a temperature having a correlation with the temperature of the fuel cell is a predetermined temperature or less, the control section instructs the refrigerant system to stop a supply of the refrigerant during system stop, and to resume the supply of the refrigerant after elapse of a predetermined time while allowing the fuel cell to generate the power in a state in which a supply of the first reactive gas to the fuel cell is blocked, and wherein the control section is further programmed to control the supply of the refrigerant to the fuel cell so that a temperature difference between the fuel cell and the refrigerant to be supplied to the fuel cell has a predetermined value or less.

2. The fuel cell system according to claim 1, wherein the refrigerant system intermittently supplies the refrigerant to the fuel cell.

3. The fuel cell system according to claim 1, further comprising:
   an abnormality judgment section which judges an abnormality of the refrigerant system based on the temperature of the refrigerant discharged from the fuel cell.

4. A method for stopping an operation of a fuel cell system comprising the steps of:
   providing a fuel cell which has a catalyst layer therein and which receives supply of a first reactive gas and a second reactive gas to generate a power, and a refrigerant system which supplies a refrigerant to the fuel cell to control a temperature of the fuel cell;
   when a presumed temperature of the fuel cell during the next system start or a temperature having a correlation with the temperature of the fuel cell is a predetermined temperature or less, stopping a supply of the refrigerant during system stop, and resuming the supply of the refrigerant after elapse of a predetermined time while allowing the fuel cell to generate the power in a state in which a supply of the first reactive gas to the fuel cell is blocked; and
   controlling the supply of refrigerant to the fuel cell so that a temperature difference between the fuel cell and the refrigerant has a predetermined value or less.

* * * * *